US 6,978,230 B1

(12) United States Patent
Klosowski et al.

(10) Patent No.: US 6,978,230 B1
(45) Date of Patent: Dec. 20, 2005

(54) APPARATUS, SYSTEM, AND METHOD FOR DRAPING ANNOTATIONS ON TO A GEOMETRIC SURFACE

(75) Inventors: James T. Klosowski, Rye, NY (US); Frank Suits, Garrison, NY (US); William P. Horn, Scarsdale, NY (US); Gerard Lecina, Suresnes (FR)

(73) Assignee: International Business Machines Corporation, Armonk, NY (US)

( * ) Notice: Subject to any disclaimer, the term of this patent is extended or adjusted under 35 U.S.C. 154(b) by 780 days.

(21) Appl. No.: 09/686,780

(22) Filed: Oct. 10, 2000

(51) Int. Cl.⁷ .......................................... G06F 9/455
(52) U.S. Cl. .................... 703/7; 345/422; 345/423; 345/420
(58) Field of Search .................... 345/424–428, 345/419–423, 582, 621, 624, 630, 420; 707/102, 707/501; 700/98; 702/155; 703/7

(56) References Cited

U.S. PATENT DOCUMENTS

| | | | |
|---|---|---|---|
| 5,243,665 A * | 9/1993 | Maney et al. | 382/152 |
| 5,363,475 A * | 11/1994 | Baker et al. | 345/422 |
| 5,448,686 A | 9/1995 | Borrel et al. | 345/420 |
| 5,586,232 A * | 12/1996 | Yoshida | 345/427 |
| 5,845,288 A * | 12/1998 | Syeda-Mahmood | 707/102 |
| 5,907,850 A * | 5/1999 | Krause et al. | 715/501.1 |
| 5,929,860 A | 7/1999 | Hoppe | 345/419 |
| 6,100,902 A | 8/2000 | Horikawa et al. | 345/441 |
| 6,256,039 B1 * | 7/2001 | Krishnamurthy | 345/420 |
| 6,260,000 B1 * | 7/2001 | Karasaki et al. | 702/155 |
| 6,313,836 B1 * | 11/2001 | Russell et al. | 345/419 |
| 6,518,964 B1 * | 2/2003 | Suits et al. | 345/419 |
| 6,525,731 B1 * | 2/2003 | Suits et al. | 345/427 |
| 6,570,568 B1 * | 5/2003 | Horn et al. | 345/428 |
| 6,611,725 B1 * | 8/2003 | Harrison et al. | 700/98 |
| 6,633,290 B1 * | 10/2003 | Kung et al. | 345/423 |
| 6,690,371 B1 * | 2/2004 | Okerlund et al. | 345/424 |

OTHER PUBLICATIONS

Rose et al., "Annotating real-world objects using augmented reality", European computer industry research center, Geramny, Jun. 1995.*
Suits et al. "Simplification of surface annotations", IEEE, Oct. 2000.*
Karasick et al., "Schemata for iinterrogating solid boundaries", ACM, May, 1991.*
Wu et al., "Wide-range, person and illumination intensive head orientation estimation", IEEE, Mar. 2000.*
M. Garland and P. S. Heckbert, "Surface Simplification Using Quadric Error Metrics," Carnegie Mellon Univ., 7 pages.
M. Garland and P. S. Heckbert, "Simplifying Surfaces with Color and Texture Using Quadric Error Metrics," Carnegie Mellon Univ., 8 pages.
P. Cignoni, C. Montani, C. Rocchini, R. Scopigno, "A general method for preserving attribute values on simplified meshes," Istituto di Elaborazione dell'Informazione, pp. 59-66, p. 518.

(Continued)

Primary Examiner—Paul L. Rodriguez
Assistant Examiner—Kandasamy Thangavelu
(74) Attorney, Agent, or Firm—Eric W. Petraske; Louis P. Herzberg (57) ABSTRACT

Vertices of an annotation are projected onto a surface of a (2D or 3D) model and reconnected to preserve the original appearance of the annotation. The result of our method is a new set of geometry for the annotation that geometrically conforms to the surface of the model. A plane is defined by the midpoint of the original line segment and the two projected vertices. This plane is used to create the new line segments that conform to the surface, e.g. by doing a "surface walk" between the projected points along the line defined by the intersection of the plane and the surface.

6 Claims, 9 Drawing Sheets

OTHER PUBLICATIONS

H. Hoppe, "New Quadric Metric for Simplifying Meshes with Appearance Attributes," Microsoft Research, 8 pages.

Paul S. Heckbert, "Survery [sic] of Texture Mapping," Pixar, *IEEE Computer Graphics and Applications*, Nov. 1986, pp. 321-332.

J. Chen and Y. Han, "Shortest Paths on a Polyhedron," Dept. of Computer Science, Univ. of Kentucky, 1990 ACM, pp. 360-369.

G. Barequet, D. Z. Chen, O. Daescu, M. T. Goodrich, J. Snoeyink, "Efficiently Approximately Polygonal Paths in Three and Higher Dimensions," ACM 1998, pp. 317-326.

D. Eu and G. T. Toussaint, "On Approximating Polygonal Curves in Two and Three Dimensions," School of Computer Science, McGill Univ., Montreal, Quebec, 1994 by Academic Press, Inc., pp. 231-246.

P. Lindstrom, G. Turk, "Fast and Memory Efficient Polygonal Simplification," Georgia Institute of Technology, 7 pages.

P. S. Heckbert and M. Garland, "Survey of Polygonal Surface Simplification Algorithms," School of Computer Science, Carnegie Mellon University, May 1, 1997, pp. 1-29.

Peter Lindstrom, "Out-of-Core Simplification of Large Polygonal Models," Georgia Institute of Tech., *Proceedings of ACM SIGGRAPH 2000*, pp. 1-4.

J. Rossignac and P. Borrel, "Multi-resolution 3D approximations for rendering complex scenes," Interactive Geometric Modeling, IBM TJ Watson Research Center, pp. 455-465.

\* cited by examiner

APPARATUS, SYSTEM, AND METHOD FOR DRAPING ANNOTATIONS ON TO A GEOMETRIC SURFACE

RELATED APPLICATIONS

This application is also related to U.S. patent application Ser. No. 09/686,720 entitled "System and Method for Coordinated Simplification of Surface and Wire-frame Descriptions of a Geometric Model" to Horn, et al., now U.S. Pat. No. 6,570,568 and to U.S. patent application Ser. No. 09/686,643 entitled "Apparatus, System, and Method for Simplifying Annotations on a Geometric Surface" to Suits, et al., now U.S. Pat. No. 6,518,964, both of which are assigned to the assignees hereof, filed on the same day as this disclosure and are herein incorporated by reference in their entirety.

BACKGROUND OF THE INVENTION

In CAD/CAM (Computer Aided Design/Computer Aided Manufacturing) and many other industries, one needs to view and interact with three-dimensional (3D) models obtained from a local machine or a remote server. These 3D models contain both geometry and surface features. The geometry of a model defines its shape, typically as a set of vertices and their connectivity. The connectivity of a model defines how the vertices are connected together to form the surface of the model. For example, vertices are often connected together as triangles or quadrilaterals. These surface shapes are often referred to as polygons. The surface features of a model contain additional information in the form of attributes and annotations. The attributes refer to data values specified for the geometry of the model, such as colors or normals. These values may be specified for each of the vertices, for each of the polygons, or for each vertex/polygon pair, also referred to as a corner. Annotations are used to provide further information about the model, often in the form of line segments or text mapped onto the surface of the model. For example, if the 3D model was of a geographic region, the annotations could include the roads, rivers, cities, their names, for that geographic region. Another example, within the CAD/CAM domain, is to highlight the original mesh structure, i.e. wireframe, of a geometric model. This mesh structure contains line segments, also known as edges, between the vertices of the model.

There is a growing need to represent complex three-dimensional models by simplified versions that are less expensive to store in memory on a computer, faster to transmit across a network from one computer to another computer, and faster to render on a computer. To address this great need, many techniques have been developed to simplify a model with minimal loss in perceived quality. See, for example, U.S. Pat. No. 5,929,860 or the article "Surface Simplification Using Quadric Error Metrics," by M. Garland and P. Heckbert, in Computer Graphics Proceedings, Annual Conference Series, 1997, pages 209–216. Such techniques attempt to reduce the geometry of the model so that when the simplified model is rendered on a computer, the viewer will be able to perceive few, if any, differences as compared to a rendering of the original model. To accomplish this goal, many of the simplification techniques take the attributes of the model into account as well when simplifying the geometry. See, for example, U.S. Pat. No. 6,100,902; P. Cignoni, C. Montani, C. Rocchini, and R. Scopigno, "A General Method for Preserving Attribute Values on Simplified Meshes", Proceedings of IEEE Visualization, pages 59–66, 1998; M. Garland and P. Heckbert, "Simplifying Surfaces with Color and Texture Using Quadric Error Metrics," Proceedings of IEEE Visualization, pages 264–269, 1998; and H. Hoppe, "New Quadric Metric for Simplifying Meshes with Appearance Attributes," Proceedings of IEEE Visualization, pages 59–66, 1999. These techniques let the attributes guide the simplification process so that the geometry and the attributes of the simplified model appear the same as in the original model. To further preserve the overall appearance of the model, the annotations must be mapped onto the simplified model when simplification techniques are utilized, since the annotations can convey a significant amount of information.

To convey information about a model to the viewer, there is clearly a need to map the annotations of the model onto its original surface, or a simplified version of its surface in those instances when simplification has been utilized. We often refer to this mapping operation as "draping" the annotations onto the surface of the model.

Texture mapping, thoroughly described by P. Heckbert in "Survey of Texture Mapping", IEEE Computer Graphics and Applications, volume 6, number 11, pages 56–67, November 1986, refers to a technique for mapping an image onto the surface of a model. For example, let us say that we have a model of a wooden door. To convey the actual grain of the wood, we could include that within the model itself, however this would require a significant amount of additional geometry. To avoid this added complexity, texture mapping allows us to take a small image of the wood grain and map this onto the entire model so that the rendered image appears the same as if we used geometry to convey the wood grain.

Texture mapping has been commonly used to map annotations onto the surface of a model. To accomplish this, the annotations are first rendered as an image and stored in the memory of a computer. When the model is being viewed, the texture map of the annotations is applied to the surface of the model to convey the additional information provided by the annotations. Using such an approach, the annotations of a model can be mapped onto the original or simplified surface of the model, since they are stored in the form of an image.

PROBLEMS WITH THE PRIOR ART

Texture mapping requires specialized graphics hardware for adequate performance during viewing, and that hardware is not currently guaranteed to be present on all computers. In addition, texture mapping requires rendering one or more views of the annotations from different viewpoints, and projecting the rendered images onto the surface via texture coordinates. When multiple images are used to represent the annotations of the model at the same time, differences in rendering parameters between images may result in a discontinuity where the images border each other and this discontinuity can stand out as a disturbing artifact. Annotations that do not appear seamless may be hard to interpret because the eye is drawn to the abrupt changes in surface characteristics rather than the actual features on the surface. Consequently, the annotations may become an ineffective means for conveying the additional information to the viewer.

Texture maps also suffer from blurring and pixelization at high magnification. Since the annotations are stored as an image, they are recorded at a fixed resolution. Typically the resolution of the image is measured in terms of the number of pixels in width and height. If the viewer zooms into the model to see the surface details more closely, the annotations texture map will appear blurry and unnatural. The end result is that the information conveyed by the annotations will be lost by the viewer.

Texture maps are most efficient for simple geometric models. For complex models, many additional images, from different viewpoints, will be required. This will greatly exacerbate the discontinuity problem mentioned previously.

OBJECTS OF THE INVENTION

An object of this invention is an improved system and method for draping, i.e., mapping, arbitrary annotations onto a surface.

An object of this invention is an improved system and method for draping with an adequate amount of fidelity and with greater speed and simplicity.

An object of this invention is an improved system and method for projecting the vertices of an annotation onto a surface and reconnecting the projected vertices to preserve the appearance of the original annotation on the surface.

An object of this invention is an improved system and method for reconnecting the projected vertices of an annotation using the projected vertices and the midpoint of the original annotation line segments.

SUMMARY OF THE INVENTION

Vertices of an annotation are projected onto a surface of a (2D or 3D) model and reconnected to preserve the original appearance of the annotation. The result of our method is a new set of geometry for the annotation that geometrically conforms to the surface of the model. A plane is defined by the midpoint of the original line segment and the two projected vertices. This plane is used to create the new line segments that conform to the surface, e.g. by doing a "surface walk" between the projected points along the line defined by the intersection of the plane and the surface.

This invention solves the annotation mapping problem geometrically and the results do not require graphics hardware to visualize. Furthermore, the invention works well with arbitrary shapes and does not suffer from blurring under high magnification.

By maintaining the annotations as geometry, as opposed to textures, we also are able to simplify them while still maintaining the overall appearance of the model over a wide range of magnifications. At the same time, the invention does not preclude texture maps from being used to provide attribute information, such as color.

BRIEF DESCRIPTION OF THE FIGURES

The foregoing and other objects, aspects, and advantages will be better understood from the following non-limiting detailed description of preferred embodiments of the invention with reference to the drawings that include the following.

DETAILED DESCRIPTION OF THE INVENTION

Figure 1:
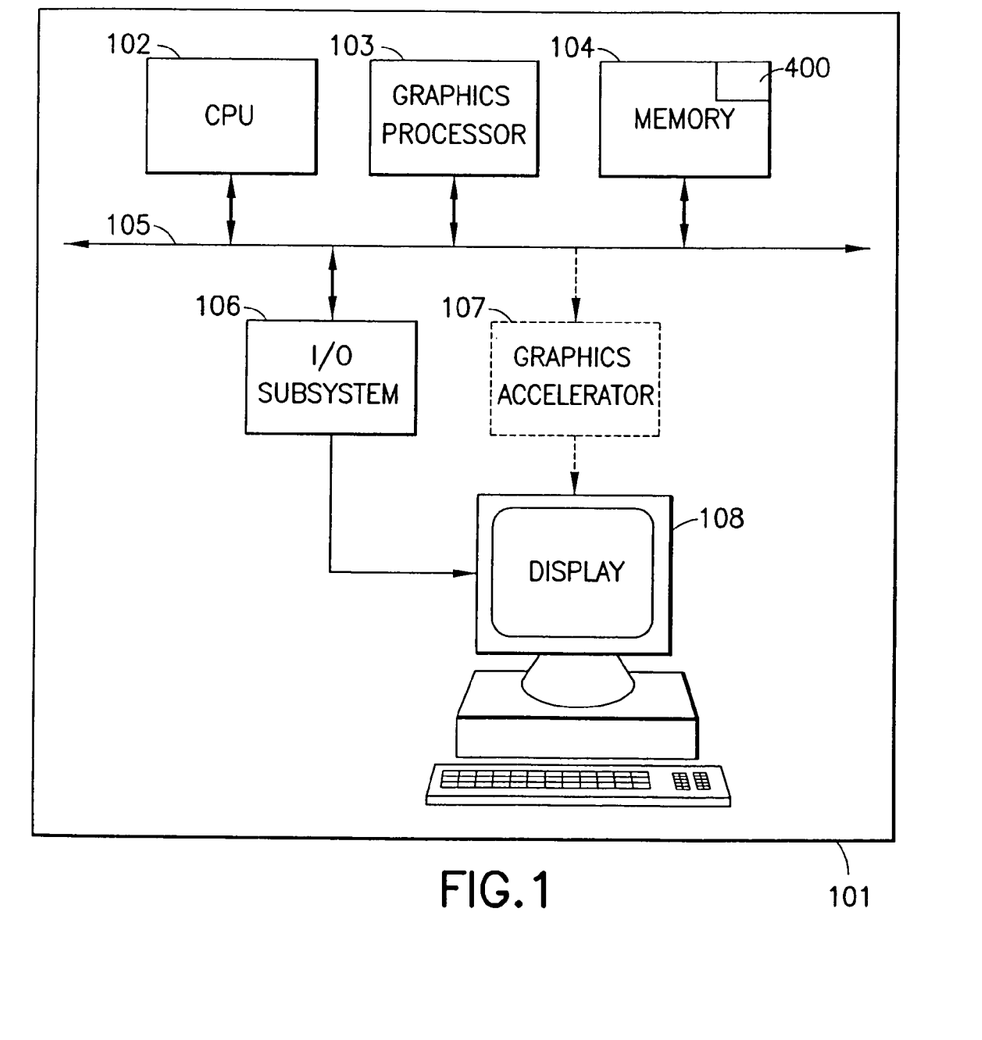
FIG. 1 is a block diagram of a preferred system embodying the present invention.
Figure 4:
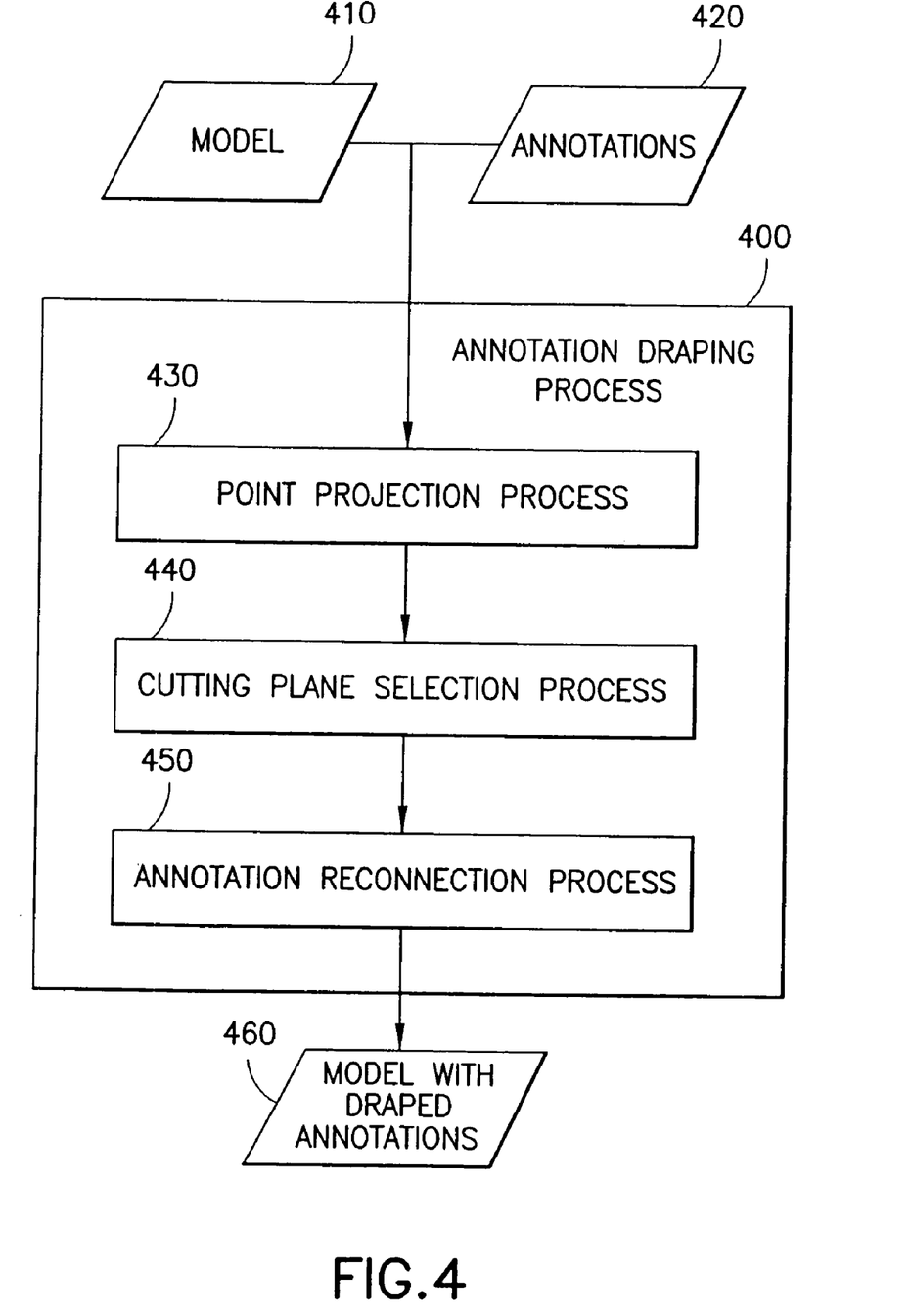
FIG. 4 is a flow chart showing an annotation draping process.

Referring now to the drawings, and more particularly, FIG. 1 is a block diagram of a preferred embodiment geometric modeling system 101 that includes a memory 104 where one or a plurality of geometric models are stored. One or more Central Processing Units (CPU) 102 access the model via the internal bus 105 and assist a graphics processor 103 in rendering the image and conveying it via the I/O subsystem 106 and the graphics accelerator 107 to the display 108. Optionally, the internal bus 105 may be connected to a network interface to transmit the geometric models across a network to remote modeling systems. These components are all well-known. A novel annotation draping process 400, described in more detail in FIG. 4, is executed by one or more of the CPUs.

Figure 2:
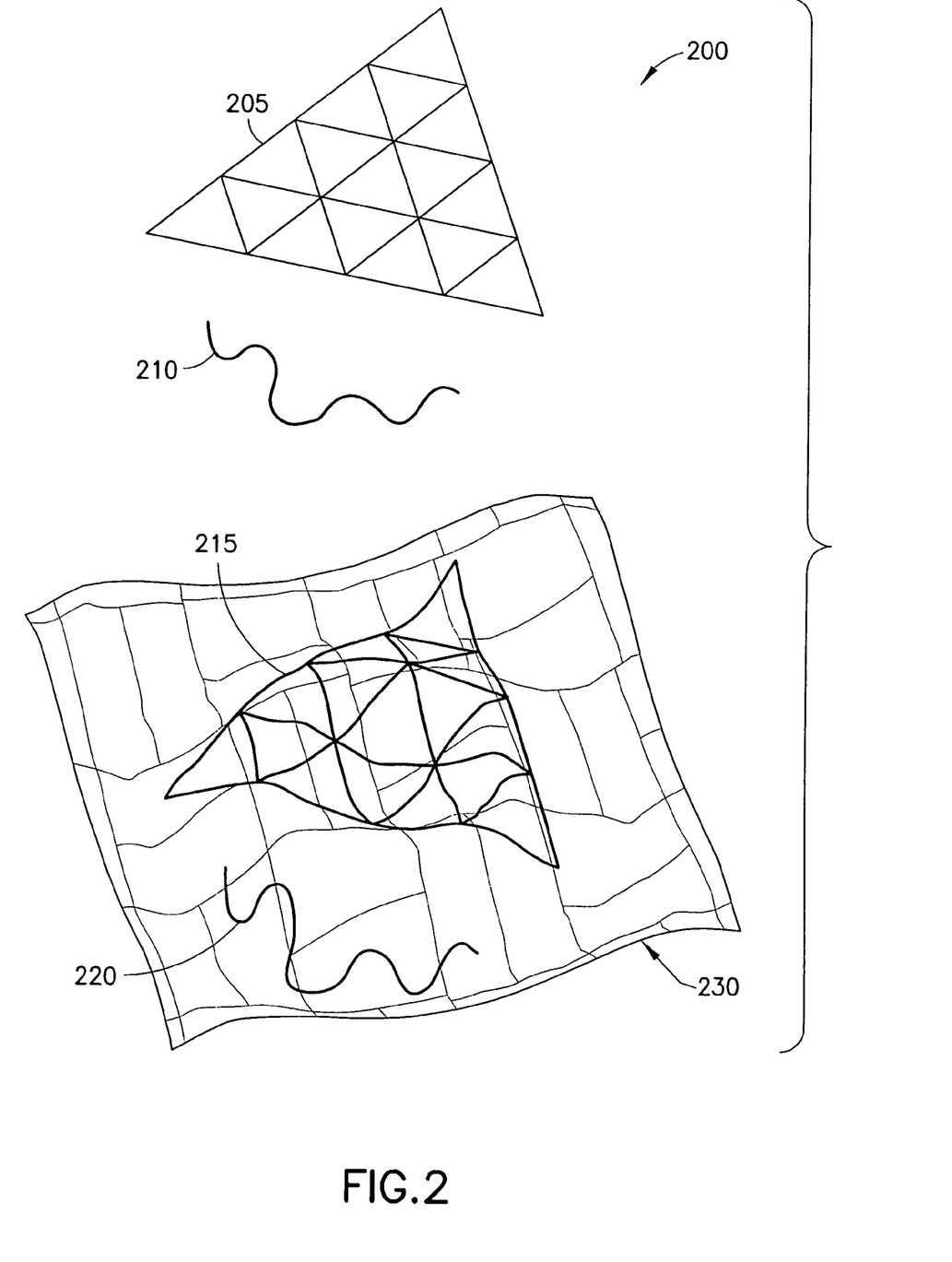
FIG. 2 is an image showing an example of annotations draped onto the surface of a model.

FIG. 2 shows an example 200 of annotations draped onto the surface of a model 230. The geometry of the model defines the actual shape of the surface. In this example, the geometry represents an undulating surface. The attributes for this model are the colors that give it the appearance of a brick wall. The annotations, e.g. 205, 210, are the line segments that are draped onto the surface of the model. Here, as an example, line segments form a triangular mesh 205 and a curved line 210. After a novel draping process, described below, the projected annotations 215, 220 maintain the same overall appearance as the original annotations 205, 210. Models 230 are well defined in the art, as are annotations. However, the prior art superimposes these annotations on the surface with distortions. The annotation draping process disclosed removes these distortions.

Figure 3A:
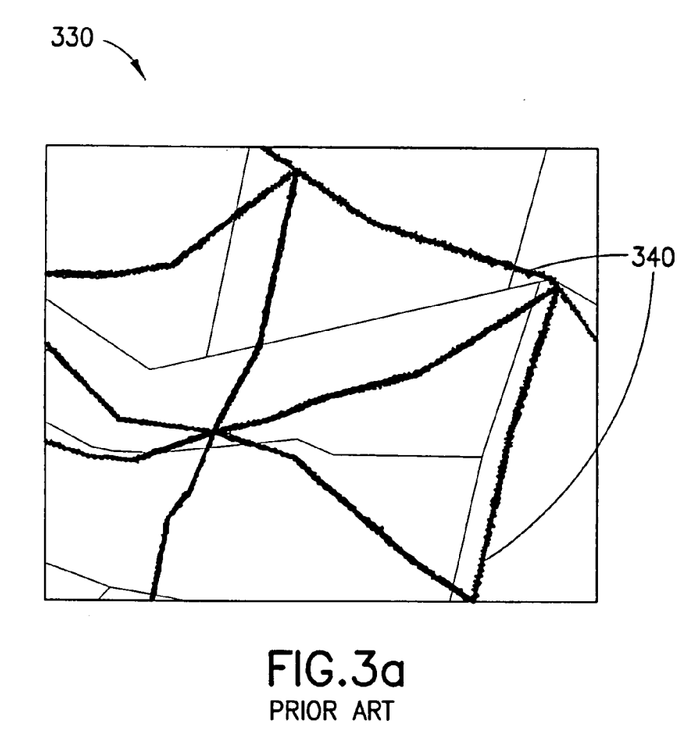
FIG. 3a is a close-up image of the same model in FIG. 2, using prior art texture maps to convey the annotation information.

FIG. 3a is a close-up image 330 of the model in FIG. 2, using the conventional prior art technique of texture maps to convey the annotation information. In this illustration, the annotations 340 are rendered and stored as an image and then texture mapped onto the model geometry. Under high magnification, the annotations are distorted, appearing blurry and pixelized, due to the fixed resolution of the texture map, which causes a distracting artifact in the rendered image. The annotations appear very jagged when the viewer zooms into the image. The lack of fidelity in representing the annotation caused by the texture map in this example can lead the viewer to make incorrect conclusions about what is being seen.

Figure 3B:
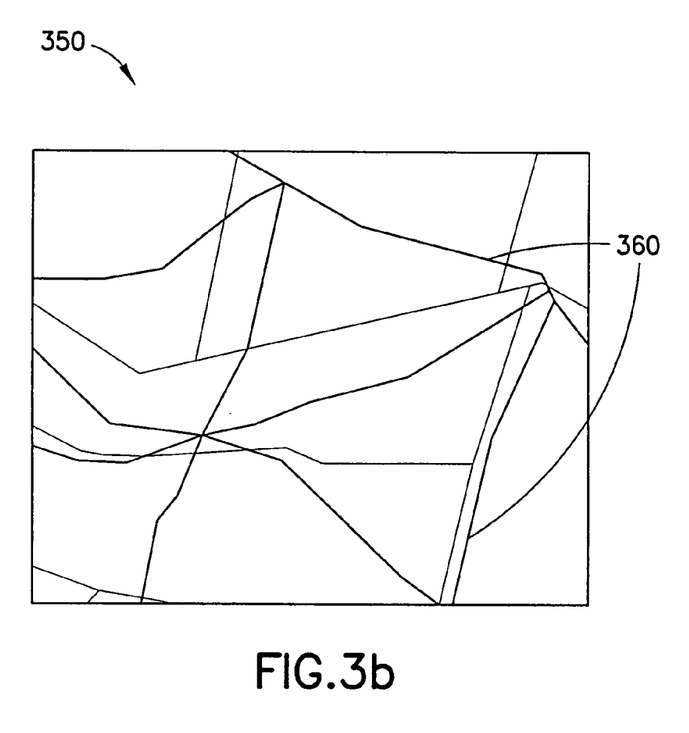
FIG. 3b is a close-up image of the model in FIG. 2, using the current invention to drape the annotations as geometry onto the model.

FIG. 3b is a close-up image 350 of the model in FIG. 2, using the current invention to drape the annotations 360 onto the model geometry. Since the annotations have been maintained as geometry, as opposed to texture maps, their appearance is cleanly preserved even at high magnification levels. As the viewer zooms into the model for a closer look, the annotations are rendered as geometry for the current viewing parameters and will therefore appear very smooth. They will not be seen as jagged, blurry edges, as in the prior art methods. The annotations are crisp and clean, and the viewer can more accurately determine what is being seen.

FIG. 4 is a flow chart of the novel annotation draping process 400. The process accepts as input a geometric model 410 and one or more annotations 420. The annotations are specified as geometry, in the form of a set of vertices V and a set of edges E, which connect the vertices within V together to form the edges of the annotations. The process 400 of draping the annotations onto the surface of the model comprises three stages, which are discussed in further detail below. The point projection process 430 projects the set of vertices V onto the surface of the model. The cutting plane selection process 440 chooses a plane for each edge of the annotations to define the path of the draped edge along the surface of the model. The annotation reconnection process 450 reconnects the projected vertices of the annotation edges, using the plane selected in the previous process 440, to preserve the original appearance of the annotations.

The output 460 of the annotation draping process 400 is the geometric model with the annotations draped onto its surface.

Figure 5:
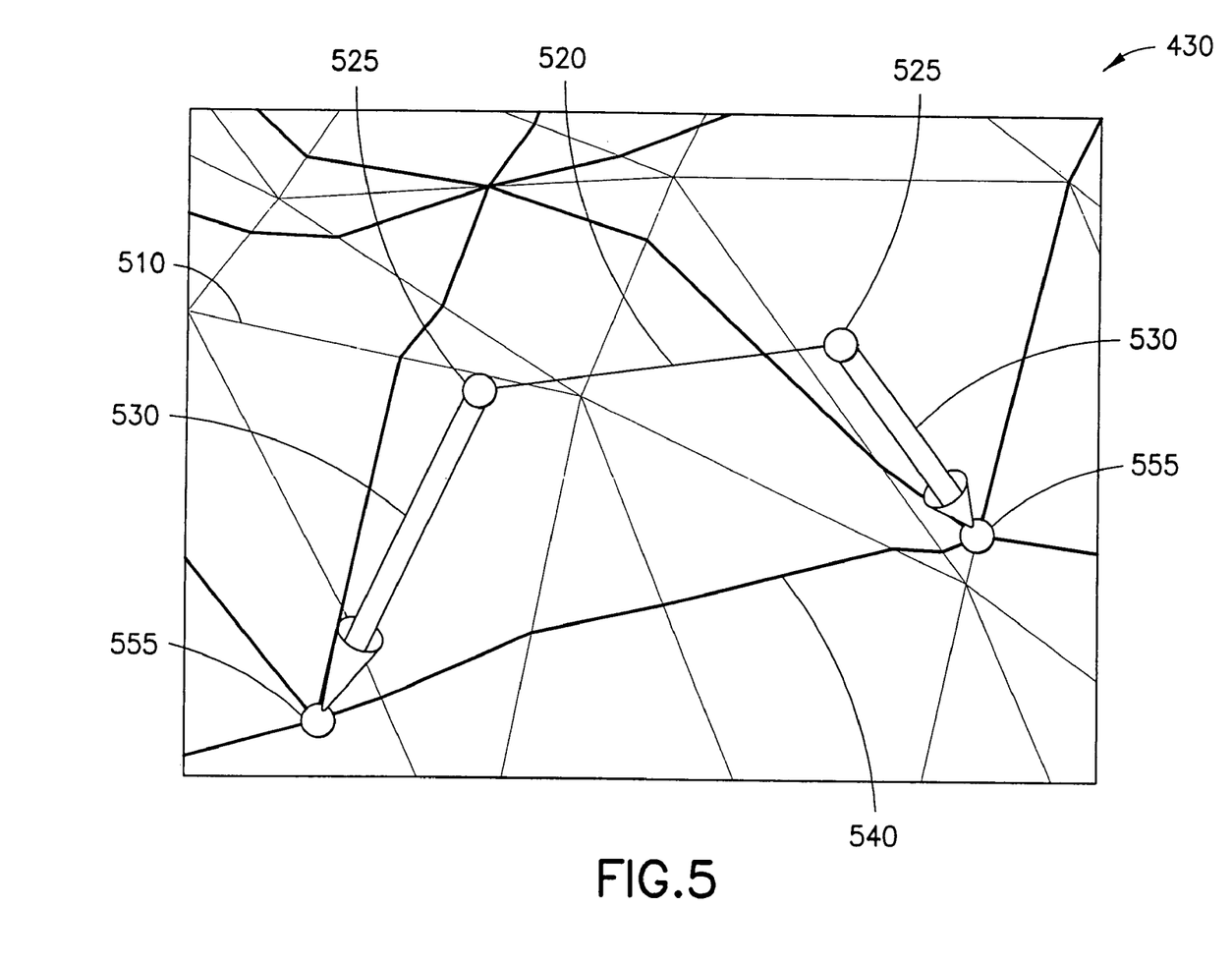
FIG. 5 is an image of the projection of the annotation vertices.

FIG. 5 is an image illustrating the point projection process 430. This first stage of the annotation draping process 400, described in FIG. 4, projects the set of vertices V of the annotations onto the surface of the model. The surface of the model in this example comprises triangles, whose edges are shown as white line segments 510. In this illustration, the two vertices 525 of an edge 520 of an annotation are projected onto the surface of the model. Arrows 530 highlight the direction in which the annotation vertices 525 are projected onto the surface, resulting in two new vertices 555. Upon completion of the annotation draping process 400, the draped annotation edges appear as black line segments 540.

There are well-known prior art techniques for projecting arbitrary vertices onto a surface. In these techniques, the projection algorithm typically finds the nearest point on the surface to the original point. However, the criteria for projecting the vertices of an annotation are somewhat unique since one needs only a visually appropriate approximation of the projection, and one that avoids the creation of short segments during the annotation reconnection process 450 that appear when a projected point lands near the vertex or edge of a surface triangle. To meet these special criteria, we use a tolerance value, epsilon, based on a percentage of the average annotation edge length, that forces the projected vertices to snap first to the nearest surface vertex within epsilon of the projected vertex, and if no surface vertex is within that range, to snap the projected vertex to the nearest surface edge within the epsilon range. If the vertex does not snap to a surface vertex or edge, it simply projects directly into the nearest surface triangle. The annotation vertex 525 on the right of FIG. 5 projects near to a triangle edge and snaps onto the edge, while the vertex 525 on the left does not snap and remains in the interior of the triangle. Note that the draped annotation edges 540 appear crooked due to the low angle of view and the creases between adjacent triangles; from above, the draped edges appear straight.

Figure 6:
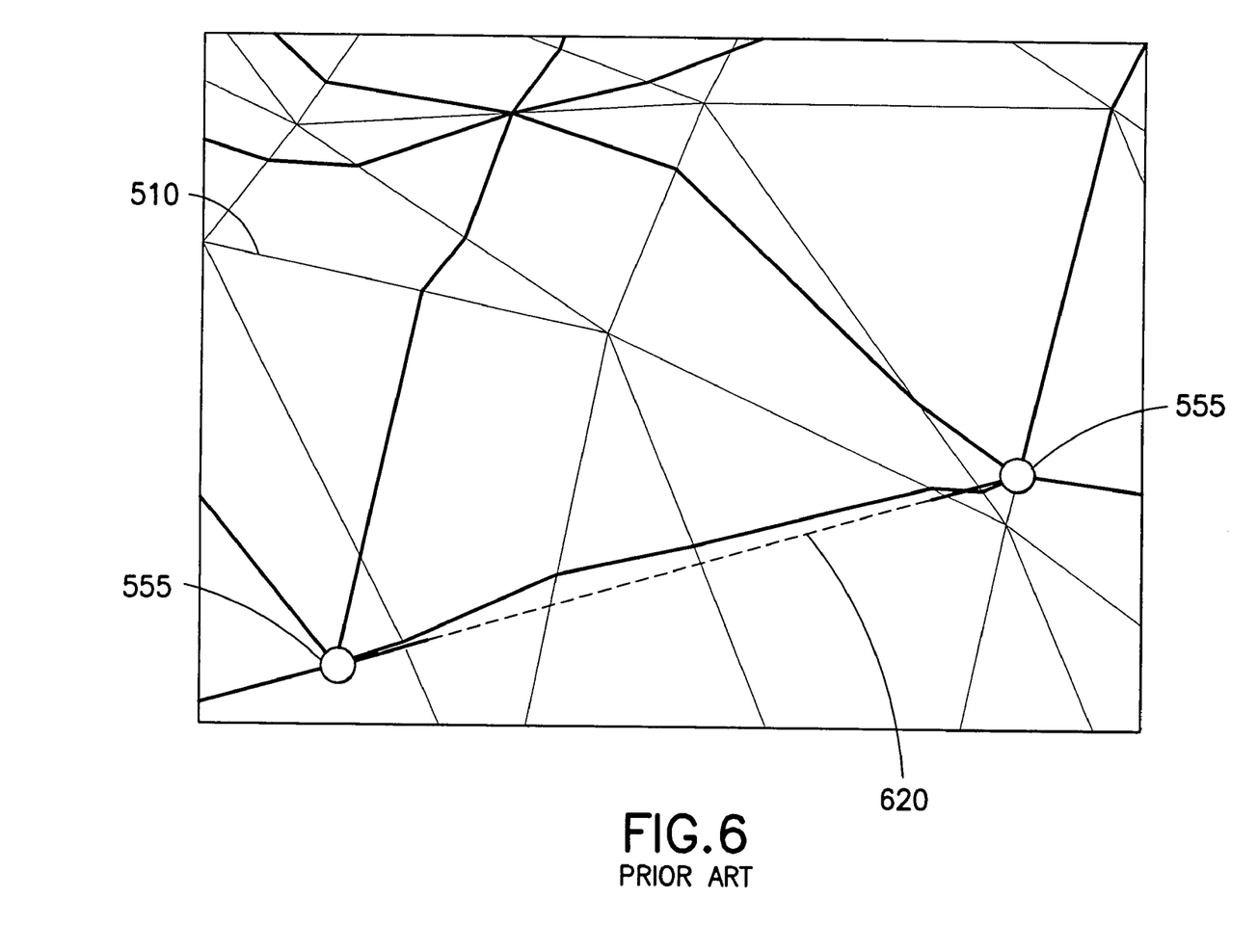
FIG. 6 is an image of prior art that directly connects the projected annotation vertices.

Once the annotation vertices are projected onto the surface of the model, the problem becomes how to reconnect them while conforming to the surface, yet retaining the straight appearance of the original annotation edges. FIG. 6 shows a prior art technique in which the two projected vertices 555 of an annotation are directly connected without regard for the surface triangles 510 shown as white line segments. The resulting edge 620, shown using transparency, penetrates deeply into the surface. Alternatively, the edge could also float high above the surface. Either artifact stands out perceptually and would distort the information carried by the draped annotation.

The problem of finding the shortest path between two points which conforms to a surface is known to be computationally expensive (see J. Chen and Y. Han, "Shortest Paths on a Polyhedron", Proceedings of Sixth Annual Symposium on Computational Geometry, pages 360–369, 1990) and therefore cannot be used within a practical draping algorithm in a geometric modeling system. Since the goal is to efficiently produce a version of the annotation edges on the surface of the model that are visually consistent with the original, the requirement that the path be shortest in distance can be exchanged for a requirement that the path appear straight when viewed from somewhere above the surface.

To fulfill this requirement, the current invention selects a cutting plane for each edge of the annotation to define the path of the draped edge along the surface of the model. The cutting a plane selection process 440, defined using the flow chart in FIG. 7, requires three inputs for each edge of the annotations: the original annotation edge vertices (v0, v1) 705, the projected vertices (p0, p1) 710 from the point projection process 430 which correspond to v0 and v1 respectively, and the surface triangles (t0, t1) 715 that contain the projected vertices p0 and p1 respectively.

Figure 7:
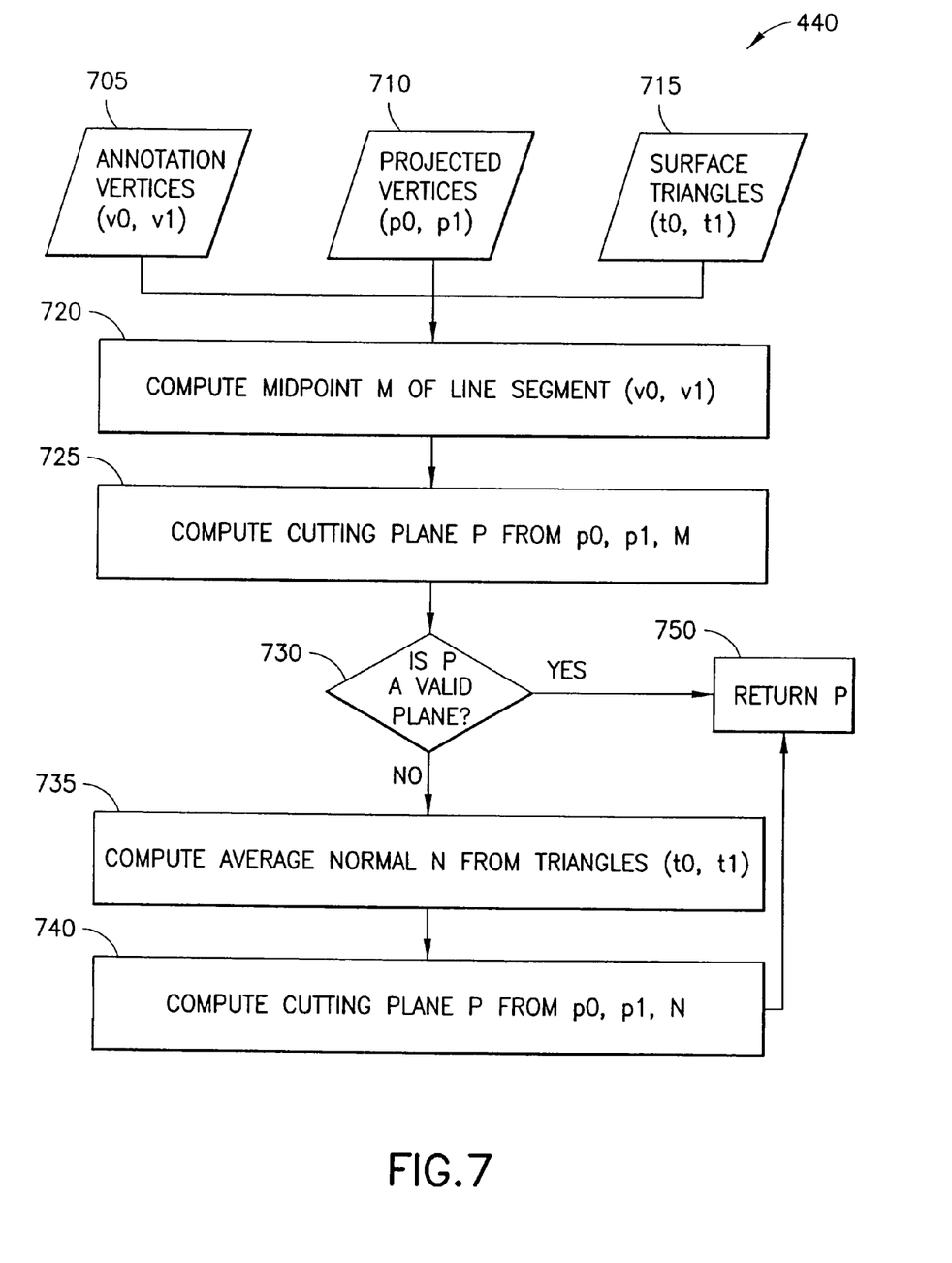
FIG. 7 is a flow chart showing the cutting plane selection process.

The cutting plane must pass through the two projected vertices 710 of the annotation edge, however, with only two selected points, a plane cannot be defined. To properly define the plane, a third point must be selected. We do this by computing 720 the midpoint M of the original annotation edge between v0 and v1. Using p0, p1, and M, we can then compute 725 the cutting plane P for this annotation edge. In some instances, these three points may be collinear and not define a valid plane. We therefore must test 730 to see if P is valid. If P is not a valid plane, we use an alternative scheme that computes 735 the average normal N for the surface triangles t0 and t1. The surface normal indicates the direction in which the triangle is facing. Using p0, p1, and N, we can then recompute 740 the cutting plane P for the annotation edge. We complete the cutting plane selection process 440 by returning the valid cutting plane P.

Figure 8:
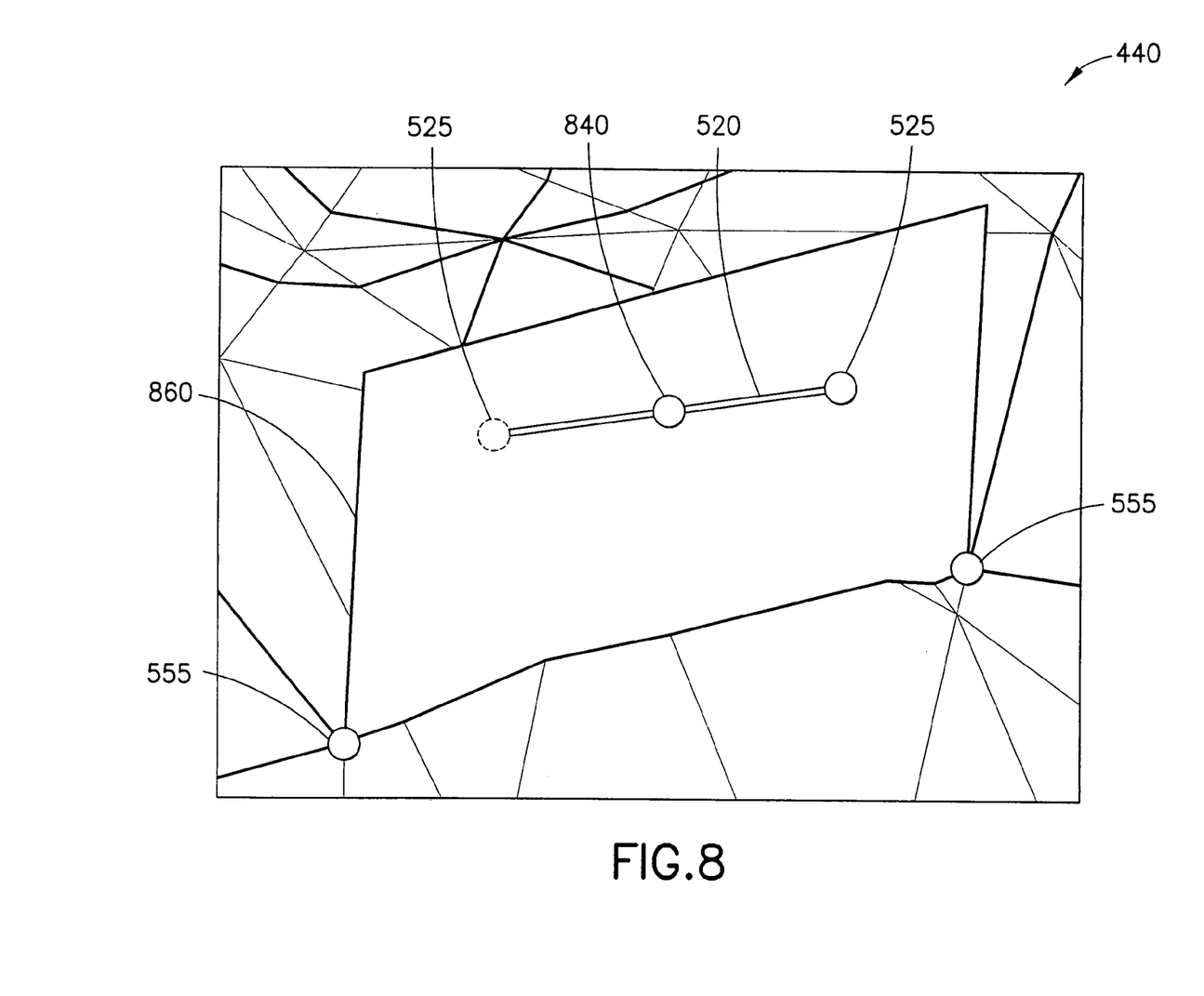
FIG. 8 is an image of the cutting plane used within the annotation reconnection process.

FIG. 8 illustrates the cutting plane selection process 440. The original annotation edge 520 and vertices (v0, v1) 525 are shown, as well as the projected vertices (p0, p1) 555 that correspond to the original vertices. Using the original vertices 525, the midpoint 840 of the annotation edge is computed. The cutting plane 860 is then computed using the projected vertices 555 and the midpoint 840 of the original edge.

Pseudo-code for the cutting plane selection process 440 is included below. The input of this process are the annotation edge vertices (vi, vj), the projected annotation edge vertices (pi, pj), and the surface triangles (ti, tj) that contain pi and pj. The ComputeCuttingPlane function takes three points as input and computes the plane containing these points. This function is well-known in the art. The InvalidPlane function, which is also well-known, determines if the cutting plane is valid. The SelectNormal function chooses an appropriate normal to compute the cutting plane. This normal may be the normal of either of the surface triangles (ti, tj), or may be the average of the two surface normals. The valid cutting plane for the annotation edge is computed and returned by this process.

CuttingPlaneSelectionProcess(vi, vj, pi, pj, ti, tj)

```
{
/*
 * This process selects the cutting plane to be used to drape the current
   annotation edge;
 * vi, vj are the annotation edge vertices;
 * pi, pj are the projected annotation edge vertices; and
 * ti, tj are the surface triangles that contain pi, pj.
 */
midpoint = (vi + vj) / 2;
cutPlane = ComputeCuttingPlane(pi, pj, midpoint);
if(InvalidPlane(cutPlane))
{
  normal = SelectNormal(ti, tj);
  tempPoint = pi + normal;
  cutPlane = ComputeCuttingPlane(pi, pj, tempPoint);
}
return cutPlane;
}
```

For each of the original edges of the annotation, we must reconnect the projected vertices to form the new draped edges that conform to the surface geometry. We have referred to this process as the annotation reconnection process 450. This process, illustrated in FIG. 9, can be thought of as walking along the surface of the model since our algorithm begins at one of the projected endpoints and walks from triangle to triangle, creating new edges as necessary, until the second projected endpoint is reached. The "surface walk" process is guided by the cutting plane P computed in the cutting plane selection process 440. The projected vertices 555 and cutting plane P are highlighted in FIG. 9. The annotation reconnection process 450 will create new edge segments 920 as it walks from triangle to triangle along the surface of the model 510. In this example, the reconnection process has created six new edges which represent the draped original annotation edge.

Figure 9:
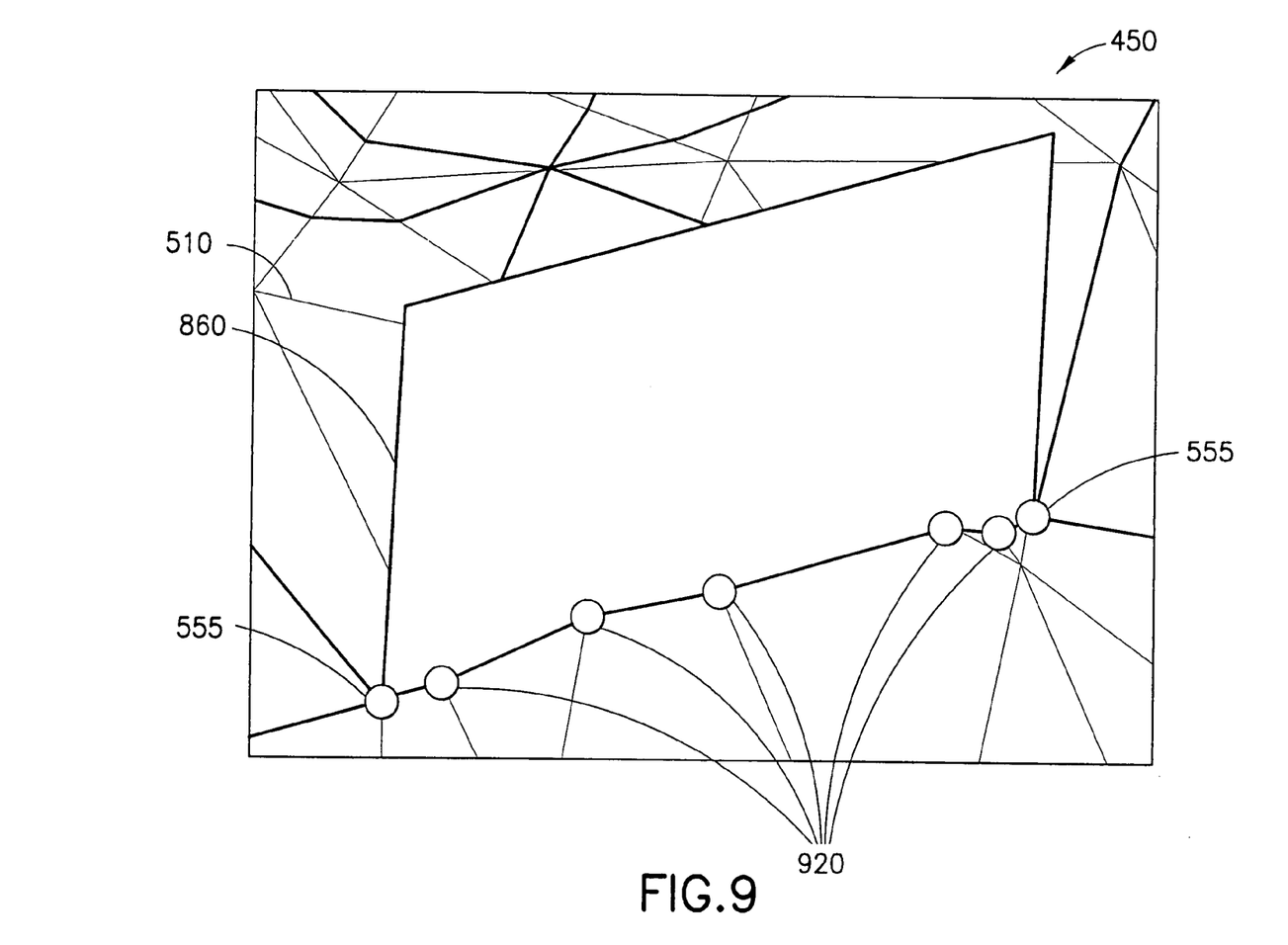
FIG. 9 is an image of a draped annotation on the surface of a model.

Pseudo-code for the annotation reconnection process 450 is included below. The input for this process are the projected annotation edge vertices (pi, pj), the surface triangles (ti, tj) that contain pi and pj, and the valid cutting plane (cutPlane) selected for this annotation edge. The IntersectSurfaceWithCutPlane function intersects the cutPlane with the surface triangle startTri. The routine computes and returns the intermediate point (tempPoint) and surface triangle (tempTri) during the surface walk from pi to pj. The OutputDrapedEdge routine stores the newly computed draped edge in the computer's memory for later rendering.

AnnotationReconnectionProcess(pi, pj, ti, tj, cutPlane)

```
{
/*
 * This process outputs the new draped edge segments for the current
   annotation edge;
 * pi, pj are the projected annotation edge vertices;
 * ti, tj are the surface triangles that contain pi, pj; and
 * cutPlane is the cutting plane selected for this annotation edge.
 */
if(ti == tj)
  done = true;
else
  done = false;
startPoint = pi;
endPoint = pj;
startTri = ti;
endTri = tj;
while (not done)
{
  IntersectSurfaceWithCutPlane(startTri, cutPlane, tempPoint, tempTri);
  OutputDrapedEdge(startPoint, tempPoint);
  startPoint = tempPoint;
  startTri = tempTri;
  if(startTri == endTri)
    done = true;
}
OutputDrapedEdge(startPoint, endPoint);
}
```

We claim:

1. A computer implemented method for annotating the surface of a computer model having a set of computer model vertices and computer model polygons, wherein the annotations comprise line segments and are specified as geometry in the form of a set of annotation vertices and annotation edges that connect the vertices, comprising the steps of:
   a) Selecting an annotation edge that connects a pair of the annotation vertices;
   b) projecting the pair of annotation vertices of the edge onto the surface of the computer model to obtain projected vertices;
   c) selecting a cutting plane between the pair of the projected vertices in which the cutting plane is selected by one of i) the pair of projected vertices and a midpoint of the relevant annotation edge and ii) the pair of projected vertices and an average of normals to surface polygons that contain the pair of projected vertices;
   d) cutting the surface of the model with the cutting plane, the plane intersecting the model on a cutting line;
   e) reconnecting the pair of projected vertices on the surface of the model by identifying points of intersection of the cutting plane with edges of the surface polygons, connecting one of the projected vertices to the nearest intersection point on the surface polygon edges, connecting the intersection points on each successive polygon that was intersected till the surface polygon on which the second projected vertex lies and then connecting a last intersection point to the second projected vertex, to produce the projection of the annotation edge on the computer model; and
   e) repeating steps b) to e) for each annotation edge in the annotation specified.

2. A method as in claim 1, where if the projected vertices and the midpoint of the annotation edge are collinear, the cutting plane is defined by containing the two projected vertices and a normal to the surface of the model at one or more of the projected vertices.

3. A method as in claim 1, where the projected vertices are projected on the surface within a tolerance by snapping.

4. A computer system that annotates a surface of a computer model having a set of computer model vertices and computer model polygons, wherein the annotations comprise line segments and are specified as geometry in the form of a set of vertices and edges that connect the vertices, comprising:
   a processor to execute a program of instructions stored in a memory of the computer;
   the memory to store a program of instructions for performing a method for annotating a surface of a computer model and the data defining a geometric model;
   a graphics processor and a display to display an image of the computer model and the annotation;

means for selecting an annotation edge that connects a pair of the annotation vertices;

means for projecting the pair of annotation vertices of the edge onto the surface of the computer model to obtain projected vertices;

means for selecting a cutting plane between the pair of the projected vertices in which the cutting plane is selected by one of i) the pair of projected vertices and a midpoint of the relevant annotation edge and ii) the pair of projected vertices and an average of normals to surface polygons that contain the pair of projected vertices;

means for cutting the surface of the model with the plane, the plane intersecting the model on a cutting line;

means for reconnecting the pair of projected vertices on the surface of the model by identifying points of intersection of the cutting plane with edges of the surface polygons, connecting one of the projected vertices to the nearest intersection point on the surface polygon edges, connecting the intersection points on each successive polygon that was intersected till the surface polygon on which the second projected vertex lies and then connecting a last intersection point to the second projected vertex, to produce the projection of the annotation edge on the computer model; and means for repeating the process for each annotation edge in the annotation specified.

5. A computer product having a program comprising instructions which when executed on a computer perform a process for annotating the surface of a computer model having a set of computer model vertices and computer model polygons, wherein the annotations comprise line segments and are specified as geometry in the form of a set of vertices and edges that connect the vertices, comprising the steps of:

a) Selecting an annotation edge that connects a pair of the annotation vertices;

b) projecting the pair of annotation vertices of the edge onto the surface of the computer model to obtain projected vertices;

c) selecting a cutting plane between the pair of the projected vertices in which the cutting plane is selected by one of i) the pair of projected vertices and a midpoint of the relevant annotation edge and ii) the pair of projected vertices and an average of normals to surface polygons that contain the pair of projected vertices;

d) cutting the surface of the model with the cutting plane, the plane intersecting the model on a cutting line;

e) reconnecting the pair of projected vertices on the surface of the model by identifying points of intersection of the cutting plane with edges of the surface polygons, connecting one of the projected vertices to the nearest intersection point on the surface polygon edges, connecting the intersection points on each successive polygon that was intersected till the surface polygon on which the second projected vertex lies and then connecting a last intersection point to the second projected vertex, to produce the projection of the annotation edge on the computer model; and e) repeating steps b) to e) for each annotation edge in the annotation specified.

6. A computer implemented method for annotating the surface of a computer model having a set of computer model vertices and computer model polygons, wherein the annotations comprise line segments and are specified as geometry in the form of a set of annotation vertices and annotation edges that connect the vertices, comprising the steps of:

a) Selecting an annotation edge that connects a pair of the annotation vertices;

b) projecting the pair of annotation vertices of the edge onto a surface of the computer model to obtain projected vertices, wherein said step of projecting annotation vertices comprises snapping a projected vertex to one of a nearest surface vertex and a nearest surface edge when said nearest surface vertex or nearest surface edge is within a tolerance value, and said projected vertex remaining where it is projected when said nearest surface vertex or nearest surface edge is not within said tolerance value;

c) selecting a cutting plane between the pair of the projected vertices in which the cutting plane is selected by one of i) the pair of projected vertices and a midpoint of the relevant annotation edge and ii) the pair of projected vertices and an average of normals to surface polygons that contain the pair of projected vertices;

d) cutting the surface of the model with the cutting plane, the plane intersecting the model on a cutting line;

e) reconnecting the pair of projected vertices on the surface of the model by identifying points of intersection of the cutting plane with edges of the surface polygons, connecting one of the projected vertices to the nearest intersection point on the surface polygon edges, connecting the intersection points on each successive polygon that was intersected till the surface polygon on which the second projected vertex lies and then connecting a last intersection point to the second projected vertex, to produce the projection of the annotation edge on the computer model; and e) repeating steps b) to e) for each annotation edge in the annotation specified.

* * * * *